United States Patent [19]
Weyer

[11] Patent Number: 5,609,090
[45] Date of Patent: *Mar. 11, 1997

[54] ACTUATOR WITH PROTECTIVE END CAP

[75] Inventor: Paul P. Weyer, Enumclaw, Wash.

[73] Assignee: 1994 Weyer Family Limited Partnership, Enumclaw, Wash.

[*] Notice: The portion of the term of this patent subsequent to Dec. 26, 2012, has been disclaimed.

[21] Appl. No.: 543,530

[22] Filed: Oct. 16, 1995

Related U.S. Application Data

[63] Continuation of Ser. No. 388,368, Feb. 14, 1995, Pat. No. 5,477,772.

[51] Int. Cl.$^6$ ..................................................... F01B 25/26
[52] U.S. Cl. ................. 92/5 R; 92/13.6; 92/13.8; 92/13.5; 92/33; 92/32; 74/89.15
[58] Field of Search .......................... 92/5 R, 13.5, 13.6, 92/13.7, 13.8, 31, 32, 33; 74/89.15, 409

[56] References Cited

U.S. PATENT DOCUMENTS

| | | | |
|---|---|---|---|
| 3,000,357 | 9/1961 | Geyer | 92/13.6 |
| 3,003,470 | 10/1961 | Geyer | 92/13.6 |
| 3,142,257 | 7/1964 | Schudt | 103/38 |
| 3,253,517 | 5/1966 | John et al. | 92/13 |
| 3,508,472 | 4/1970 | Hartwick, Jr. | 92/13 |
| 4,545,289 | 10/1985 | Weyer | 92/13.6 |
| 5,027,667 | 7/1991 | Weyer | 74/89.15 |
| 5,054,372 | 10/1991 | Weyer | 92/13.5 |

OTHER PUBLICATIONS

*PV & PS Series Hydraulic Valve Actuators*, Catalog PV–1094/10M, Helac Corporation, Enumclaw, Washington, pp. 1–15.

Primary Examiner—Thomas E. Denion
Attorney, Agent, or Firm—Seed and Berry LLP

[57] ABSTRACT

A fluid-powered rotary actuator for providing rotary movement between first and second external members. The actuator includes a cylindrical body with first and second ends. The body is adapted for coupling to the first external member, and a shaft extending generally coaxially within the body and supported for rotation relative thereto. The shaft having an adjustable end limit of rotation relative to the body. The shaft has an end portion adapted for coupling to the second external member to provide rotational movement between the first and second external members. An annular body insert is positioned coaxial with the body and at least partially within the body at the body first end. The body insert is formed as a separate part from the body and is adjustably rotatable relative to the body to permit adjustment of the end limit of rotation of the shaft relative to the body. The body insert is restrained by the body against axial movement relative to the body during powered operation of the actuator. An end cap is securely attached to the body at the body first end and spaced axially outward of and away from the body insert to define a compartment therebetween. An adjustment member extends through an aperture in the end cap with an interior portion within the end cap compartment in position to engage the body insert and an exterior portion accessible from the exterior of the end cap compartment. The adjustable member is adjustably movable in the aperture to apply an adjustment force on the body insert to adjustably rotate the body insert relative to the body to a selected rotational position relative to the body in order to adjust the end limit of rotation of the shaft relative to the body. The adjustment member, when not being adjustably moved in the aperture, holds the body insert to prevent its rotation from the selected rotational position relative to the body. A piston is mounted within the body and is reciprocally axially movable therein in response to selective application of pressurized fluid thereto.

17 Claims, 2 Drawing Sheets

ACTUATOR WITH PROTECTIVE END CAP

CROSS-REFERENCE TO RELATED APPLICATION

This application is a continuation of U.S. patent application Ser. No. 08/388,368, filed Feb. 14, 1995, now U.S. Pat. No. 5,477,772.

TECHNICAL FIELD

The present invention relates generally to spring and other actuators which convert an axial force into a rotational force on an output member, or vice versa.

BACKGROUND OF THE INVENTION

It is sometimes desirable to apply a linear force using a spring or other source of energy and convert that force into a rotational force. For example, emergency actuators are often spring-powered to close a valve or actuate other equipment in an emergency situation when the normal source of power used to operate the valve or equipment is lost, whether that source of power be hydraulic, electrical, or otherwise. A typical emergency valve actuator, used with a fuel line valve and operated by hydraulic fluid pressure, will be driven by a spring to close the valve, in case hydraulic pressure is lost, in order to avoid fuel leaks. One such actuator is described in U.S. Pat. No. 5,027,667.

In other situations, it is desirable to operate valves and other equipment using a simple linear piston-and-cylinder drive arrangement such as provided by a rotary helical actuator. Such an actuator typically uses a cylindrical body with an elongated rotary output shaft extending coaxially within the body. An end portion of the shaft provides the drive output. An elongated annular piston sleeve has a sleeve portion splined to cooperate with corresponding splines on a ring gear attached to the sidewall of the body and on the output shaft exterior. The piston sleeve is reciprocally mounted within the body and has a head for the application of fluid pressure to one or the other opposing sides thereof to produce axial movement of the piston sleeve. In lieu of splines, force can be transmitted between the piston sleeve and the body and the output shaft using balls or rollers.

As the piston sleeve linearly reciprocates in an axial direction within the body, the outer splines of the sleeve portion engage the splines of the ring gear to cause rotation of the sleeve portion. The resulting linear and rotational movement of the sleeve portion is transmitted through the inner splines of the sleeve portion to the splines of the shaft to cause the shaft to rotate. Bearings are typically supplied to rotatably support one or both ends of the shaft relative to the body, and to prevent longitudinal movement of the shaft.

When using such actuators to operate valves and other equipment, it is often desired to provide an indication of the rotational position of the shaft, and hence the valve or equipment to which it is connected. This can be achieved through a visual mechanical indicator mounted on the actuator shaft itself or a remote electronic display that requires an electrical signal indicative of the rotational position of the shaft. For example, a pair of microswitches are sometimes mounted on emergency fuel valve actuators in position so that one is actuated when the actuator shaft is in a rotary position corresponding to the fuel valve it operates being in an open position. The other microswitch is positioned so that it is actuated when the actuator shaft is in a rotary position corresponding to the fuel valve being in a closed position, such as occurs when the actuator is operated to close the fuel valve in an emergency situation.

The electrical signals generated by the actuation of the electronic microswitches are conveyed to a remote electronic display so that the status of that fuel valve as well as all other fuel valves in a widely distributed system can be remotely monitored by a human attendant. Of course, the signals can also be monitored by a computer to record operational data and automatically take appropriate responsive action. The generally same situation exists when an actuator is used to control other type valves and equipment.

It is critical to the reliability of the system that the electronic microswitches mounted on the actuator be protected from the environment and also from the hydraulic fluid used as the medium to operate many rotary helical actuators. Often, such actuators are mounted outdoors exposed to the elements, or if indoors, in dirty environments such as factories, warehouses and sheds where environmental contaminants can result in failure of the electronic microswitches. The presence of high pressure hydraulic fluid used to operate the actuator can also lead to contamination of the electronic microswitches and their failure. Finally, when in such environments, physical contact by equipment, workmen or work material can also damage the relatively delicate microswitches.

It is also often required on such actuators to provide a means for adjusting the end limit of rotation of the actuator shaft, while the actuator is attached to the valve or other equipment it controls. This adjustment is needed so that when the actuator shaft is rotated fully in one rotational direction where it is intended, for example, to fully close a valve, the valve will, in fact, be fully closed. It is desirable that the adjustment be accomplished with an easy and quick manual adjustment using conventional tools without requiring removal or even loosening and rotation of the actuator body from its mounting or the actuator shaft from the valve. As with the electronic microswitches it is desirable to protect this adjustment mechanism from contamination and physical contact that could damage the mechanism.

The present invention solves all of these problems while providing electronic rotational position sensors for the actuator shaft and an end limit of rotation adjustment mechanism for the shaft. The invention provides other related advantages.

SUMMARY OF THE INVENTION

The present invention resides in a rotary actuator for providing rotary movement between first and second external members. The actuator has a body with a longitudinal axis, and first and second ends. The body is adapted for coupling to the first external member. The actuator further includes a drive member or shaft extending generally coaxially within said body and supported for rotation relative thereto. The drive member has an adjustable end limit of rotation relative to the body. The drive member also has a portion adapted for coupling to the second external member to provide rotational movement between the first and second external members. A rotatable member is positioned generally coaxial with the body and at least partially within the body at the body first end. The rotatable member is formed as a separate part from the body and is adjustably rotatable relative to the body to permit adjustment of the end limit of rotation of the drive member relative to the body. The rotatable member is restrained by the body against axial movement relative to the body during powered operation of the actuator. The rotatable member has a contact portion.

A body closure is securely attached to the body at the body first end to define a compartment between the body closure and the rotatable member. The body closure has an aperture therein extending between an exterior of the actuator and the compartment. An adjustment member extends through the aperture with an interior portion within the compartment in position to engage the contact portion of the rotatable member and an exterior portion accessible from the exterior of the compartment. The adjustable member is adjustably movable in the aperture to apply an adjustment force on the contact portion of the rotatable member to adjustably rotate the rotatable member relative to the body to a selected rotational position relative to the body in order to adjust the end limit of rotation of the drive member relative to the body. The adjustable member, when not being adjustably moved in the aperture, holds the contact portion to prevent rotation of the rotatable member from the selected rotational position relative to the body.

A torque-transmitting member is mounted for reciprocal axial movement within the body. The torque-transmitting member engages the rotatable member and the drive member as the torque-transmitting member reciprocally moves within the body to translate axial movement thereof toward the body first end into one of clockwise or counterclockwise relative rotational movement between the drive member and the body, and axial movement thereof toward the body second end into the other of clockwise or counterclockwise relative rotational movement between the drive member and the body. The selected rotational position of the rotatable member relative to the body determines the end limit of rotation of the drive member relative to the body produced by the torque-transmitting member.

In the illustrated embodiment of the invention, the contact portion of the body insert projects toward the end cap and into the end cap compartment. The body insert is a circular member and the contact portion is securely attached to the circular member. The projecting member is a post received in a recess in the circular member. The adjustment member is an adjustment screw and the end cap aperture is threaded to threadably receive the adjustment screw.

In the illustrated embodiment, the adjustment member includes first and second adjustment screws and the end cap aperture includes first and second apertures, each threaded and threadably receiving a corresponding one of the first or second adjustment screws. The first and second adjustment screws are oriented such that the first adjustment screw engages the contact portion of the body insert to rotate the body insert clockwise relative to the body when rotated to move inward in the first aperture, and the second adjustment screw engages the contact portion of the body insert to rotate the body insert counterclockwise relative to the body when rotated to move inward in the second aperture.

The body insert has a threaded portion and the body has a correspondingly threaded portion to threadably couple the body insert and the body together to permit adjustment of the end limit of rotation of the shaft relative to the body while restraining the body insert against axial movement relative to the body during powered operation of the actuator. In the illustrated embodiment, the body insert has a threaded perimeter portion and the body has a correspondingly threaded interior portion to threadably receive the threaded body insert perimeter portion therewithin and couple the body insert and the body together.

The end cap has a circumferential sidewall portion with the end cap aperture therein, and the sidewall portion engages the body at the body first end. The end cap has an endwall spanning the sidewall portion. The sidewall portion sealably contacts the body insert. In the illustrated embodiment, the body includes a body sidewall and an endwall. The body insert closes the body sidewall at the body first end, and the endwall closes the body sidewall at the body second end to define a first fluid compartment within the body between the body insert and the piston toward the body first end and a second fluid compartment within the body between the body endwall and the piston toward the body second end. The end cap compartment is a dry compartment separate from the first fluid compartment.

The actuator includes an electrical end limit switch and a switch actuator positioned in the end cap compartment. The end cap has an endwall with the end limit switch mounted thereto. The shaft has an end portion extending into the end cap compartment with the switch actuator mounted thereon in position to engage and actuate the end limit switch as the shaft rotates in a first rotational direction sufficient to reach the end limit of rotation. As such, the end limit switch sends an electrical signal indicative of the shaft rotating in the first rotational direction to the end limit of rotation when actuated by the switch actuator. The actuator further includes a stop mounted to the endwall and positioned adjacent to the end limit switch to limit continued rotation of the switch actuator in the first rotational direction after the switch actuator actuates the end limit switch. The switch actuator is friction slip fit on the shaft end portion with sufficient frictional engagement to rotate with the shaft end portion and supply a sufficiently large force on the switch actuator to actuate the end limit switch when rotated by the shaft end portion in the first rotational direction into engagement therewith. The frictional engagement is sufficiently low that the stop holds the switch actuator against further rotation in the first rotational direction while the shaft end portion continues to rotate in the first direction until the shaft reaches the end limit of rotation. As such, the stop will align the switch actuator with the end limit switch when the shaft reaches the end limit of rotation.

Other features and advantages of the invention will become apparent from the following detailed description, taken in conjunction with the accompanying drawings.

DETAILED DESCRIPTION OF THE INVENTION

Figure 1:
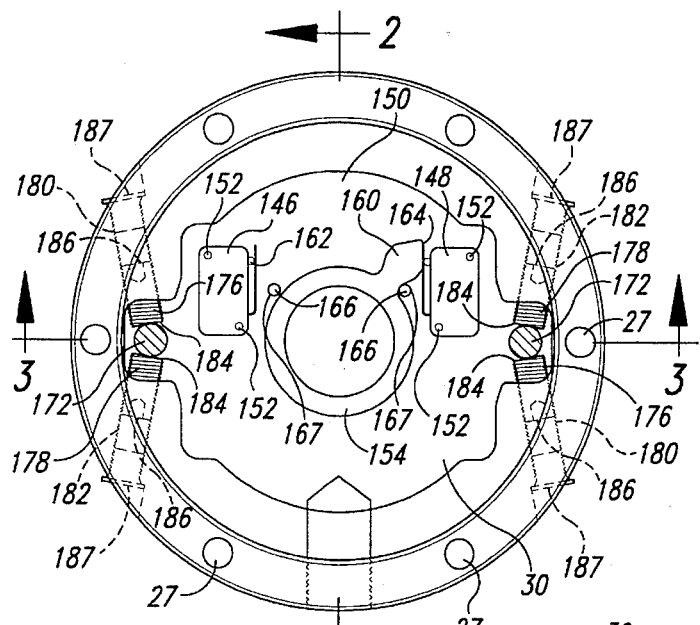
FIG. 1 is a bottom plan view of a protective end cap of the present invention shown removed from an actuator body showing two adjustment posts of a body insert in cross section.

As shown in the drawings for the purposes of illustration, the present invention is embodied in a device for converting a linear force into a rotary force, and vice versa. One embodiment of the device is a rotary spring actuator 10, shown in the drawings. The device may also take the form of a single or double action rotary helical actuator using rollers, balls, splines or any other force transmission members.

The actuator 10 shown in the drawings includes an elongated housing or body 12 having a cylindrical sidewall 14, and first and second ends 16 and 18, respectively. The body 12 includes an exteriorly threaded, annular body insert 15. The body sidewall 14 has a threaded inward end portion 14a at the first body end 16 threadably receiving a threaded portion 15a of the body insert 15. As will be described below, the body insert 15 is adjustably rotatable relative to the body sidewall 14, but the body sidewall and the body insert are locked together against rotation relative to each other during powered operation of the actuator 10.

An elongated rotary output shaft 20 having a hollow center bore 21 is coaxially positioned within the body 12 and extends substantially the full longitudinal length of the body. The body insert 15 has a central aperture 23 sized to rotatably receive the actuator shaft 20 projecting therethrough. The actuator shaft 20 is supported for rotation relative to the body 12.

An annular, protective first end cap 22 is positioned at the first body end 16 and has a circular endwall portion 24 spanning the first body end 16 of the body 12, and a sidewall portion 26 extending fully about the perimeter of the endwall portion 24 and projecting therefrom toward and engaging the body sidewall 14 at the first body end 16. The first end cap 22 has six circumferentially distributed smooth through-bores 27 and the body sidewall 14 at the first body end 16 has the same number of correspondingly distributed threaded bore holes 28 sized to receive bolts 29 which securely hold the first end cap to the body sidewall and prevent its rotation relative to the body 12 during powered operation of the actuator 10. The first end cap 22 provides a protective closure for the body 12 at the first body end 16. As will be described in greater detail below, the first end cap 22 also defines a protective enclosed compartment 30 between the end cap endwall portion 24 and the body insert 15 in which electronic switches and rotation adjustment mechanisms are located protected from contamination and physical contact that might damage and cause them to fail.

The first end cap 22 has a central aperture 32 sized to rotatably receive a stub shaft 34 projecting therethrough. A first end portion 36 of the stub shaft 34 projects outward beyond the first end cap 22, and has two flat sides for grasping with a manual tool when necessary to manually rotate the actuator shaft 20 to which the stub shaft is attached, as will be described below. A second end portion 38 of the stub shaft 34 has longitudinally extending, straight splines 40 and is received within a splined portion 42 of the central bore 21 of the actuator shaft 20 located inward from the first body end 16. The splined portion 42 of the shaft central bore 21 has longitudinally extending, straight splines 44 which mesh with the straight splines 40 of the stub shaft 34 so that the stub shaft and the actuator shaft 20 rotate together as a unit. A retainer snap ring 43 positioned in a circumferential groove in the stub shaft 34, inward of the inward side of the endwall portion 24 of the first end cap 22, limits axially outward movement of the stub shaft. A first end portion 45 of actuator shaft 20 terminates inward of the first end cap 22. A shoulder 47 of the stub shaft 34 engages the first end portion 45 of the actuator shaft 20 to limit axially inward movement of the stub shaft.

The body 12 is closed at the second body end 18 by an annular, second end cap 46 that spans the second body end. The second end cap 46 has six circumferentially distributed, smooth through-bores 48 and the body sidewall 14 at the second body end 18 has the same number of correspondingly distributed, threaded bore holes 50 sized to receive bolts 52 which securely hold the second end cap 46 to the body sidewall and prevent its rotation relative to the body 12 during powered operation of the actuator 10. The second end cap 46 has a central aperture 54 sized to rotatably receive a second end portion 56 of the actuator shaft 20 at the second body end 18 which project therethrough.

The body insert 15 has an interiorly threaded recess 58 on a side thereof toward the first end cap 22. An annular retainer 60 having a threaded outer perimeter portion 62 is threadably received within the treaded recess 58 of the body insert 15. A set screw 63 locks the body insert 15 and the retainer 60 together for rotation as a unit. The retainer 60 has a central aperture 64 sized to rotatably receive the first end portion 45 of the actuator shaft 20 which projects therethrough.

Axially inward of the shaft first end portion 45, the actuator shaft 20 has a radially outward extending flange portion 66 positioned between an inwardly projecting flange portion 68 of the body insert 15 which defines the central aperture 23 of the body insert, and an inwardly projecting flange portion 70 of the retainer 60 which defines the central aperture 64 of the retainer. The actuator shaft 20 is rotatably held in place against axial thrust by thrust bearings 72 disposed between the shaft flange portion 66 and the body insert flange portion 68, and between the shaft flange portion and the retainer flange portion 70.

An adapter shaft 74 is positioned within the central bore 21 of the actuator shaft 20 and has a first end portion 76 with longitudinally extending, straight splines 78. The first end portion 76 of the adapter shaft 74 is received within the splined portion 42 of the central bore 21 of the actuator shaft 20 with the adapter shaft 78 meshing with the straight splines 42 of the shaft central bore so that the adapter shaft and the actuator shaft rotate together as a unit. A shoulder 79 of the adapter shaft 78 engages the second end portion 56 of the actuator shaft 20 to limit axially inward movement of the adapter shaft. A second end portion 80 of the adapter shaft 74 extends outward beyond the second end cap 46 at the second body end 18. The adapter shaft second end portion 80 can be provided with a slotted shaft opening (not shown) sized to receive a correspondingly shaped rotatable valve stem (not shown) or other rotatable member of an external device (not shown) for drivably coupling the actuator 10 to the device. While a slotted arrangement using the adapter shaft 78 is described, any conventional means of attachment of the actuator shaft 20 may be used.

The second end cap 46 has a plurality of threaded recesses 82 circumferentially distributed thereabout and sized to threadably receive mounting fasteners (not shown). A stationary mounting plate (not shown) of a valve or other external device (not shown) which the actuator is being used to control, is provided with a corresponding number of correspondingly distributed, through-bores sized to receive the mounting fasteners and securely attach the actuator 10 to the mounting plate. It is to be understood that the actuator 10 may be mounted directly to the valve or other external device the actuator is being used to control.

An annular carrier or piston sleeve 84 is coaxially and reciprocally mounted within the body 12, coaxially about the shaft 20. The piston sleeve 84 has a head portion 86 positioned toward the second body end 18, and a cylindrical sleeve portion 88 fixedly attached to the head portion and extending axially therefrom toward the first body end 16.

The piston sleeve 84 has a central aperture 90 defined by an interior smooth wall portion 92 sized to rotatably receive the actuator shaft 20 therethrough.

A conventional seal 94 is located in a circumferential groove 96 in an interior smooth wall portion 98 of the body sidewall 14 positioned to be always engaged by the head portion 86 of the piston sleeve 84 as the piston sleeve reciprocates within the body 12, as will be described below. The smooth wall portion 92 of the piston sleeve 84 carries a conventional seal 100, disposed between the actuator shaft and the smooth wall portion of the piston sleeve, to define a first fluid-tight compartment 102 to the side of the head portion 86 toward the first body end 16, and a second fluid-tight compartment 104 to the side of the head portion toward the second body end 18.

Figure 2:
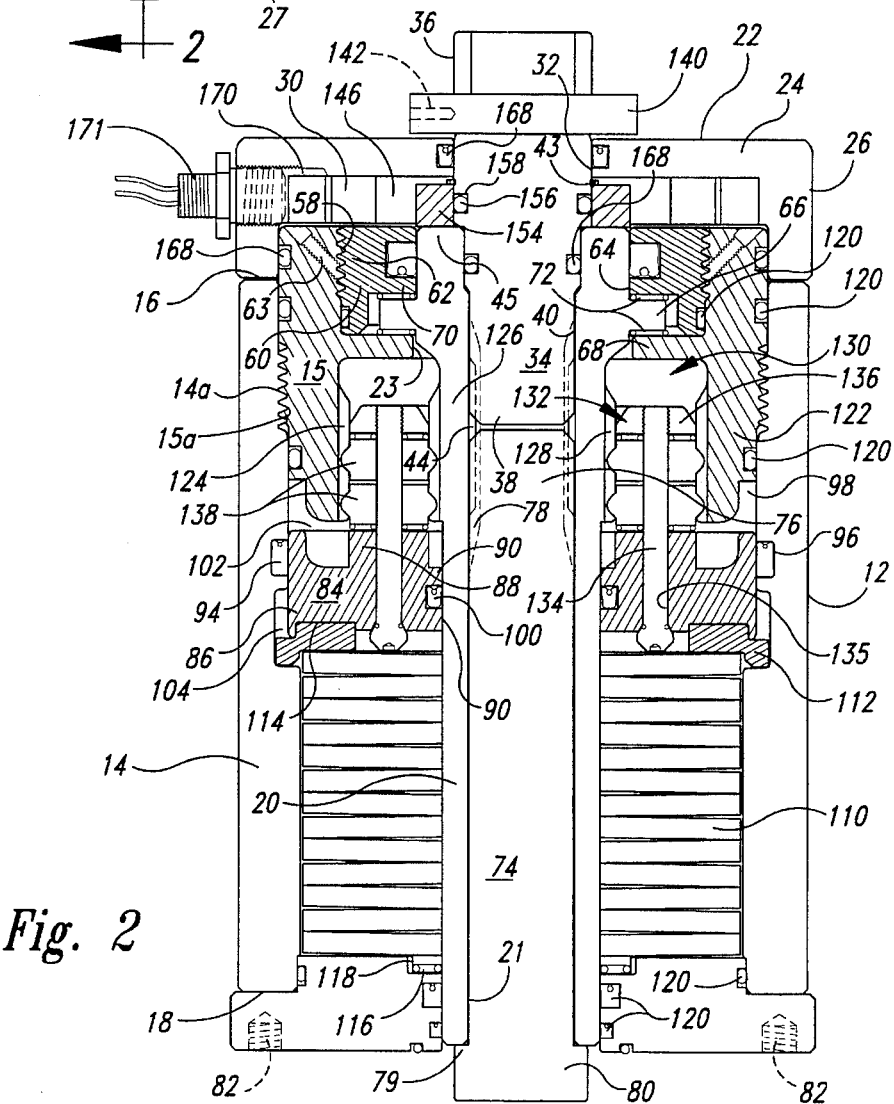
FIG. 2 is a side elevational, sectional view of a fluid-powered rotary spring actuator embodying the present invention, taken generally in the direction of lines 2—2 of FIG. 1, shown with its piston sleeve moved fully toward one end.
Figure 3:
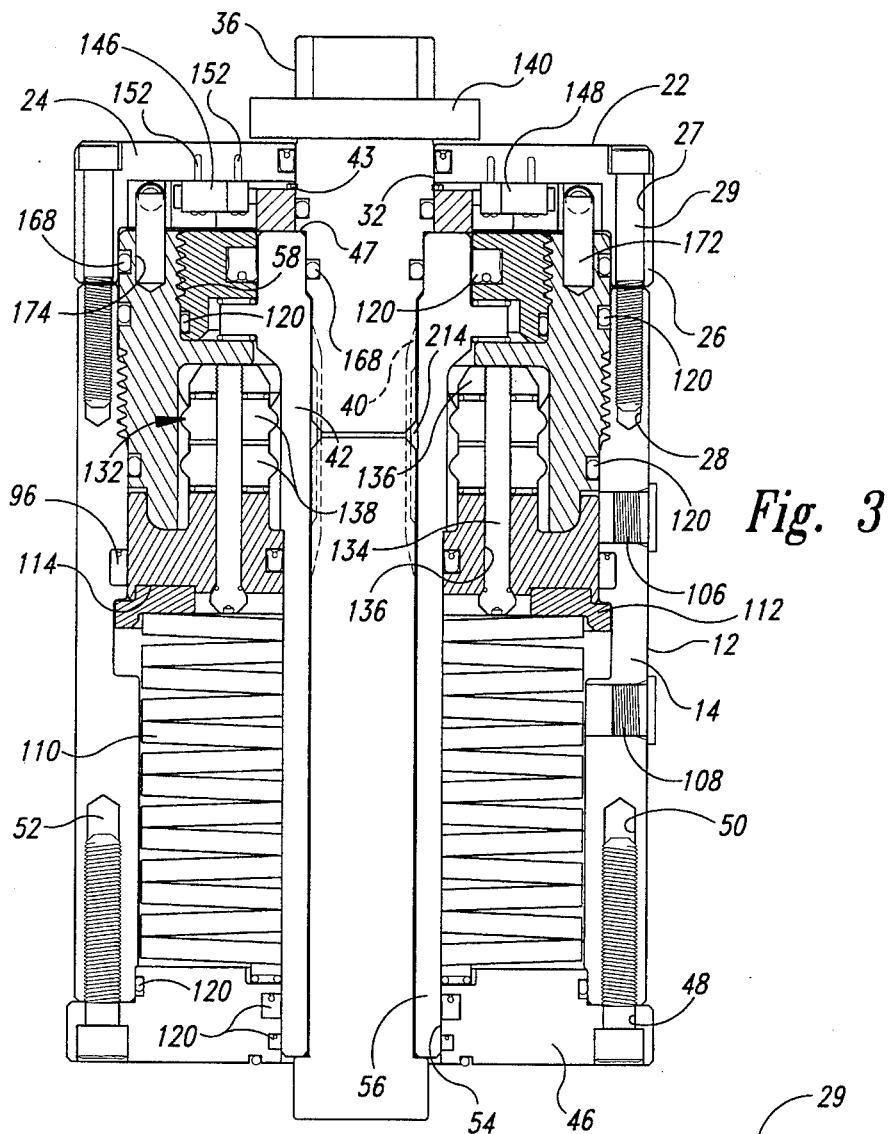
FIG. 3 is a side elevational, sectional view of the fluid-powered rotary spring actuator of FIG. 2, taken generally in the direction of lines 3—3 of FIG. 1, and rotated about 90 degrees from the view of FIG. 2, shown with its piston sleeve moved fully toward an opposite end.

Movement of the piston sleeve 84 within the body 12 toward the second body end 18 occurs when hydraulic fluid under pressure selectively enters through a port 106 located in the body sidewall 14, which communicates with the first compartment 102. The actuator 10 is shown in FIG. 2 with the piston sleeve 84 moved fully toward the second body end 16. Movement of the piston sleeve 84 within the body 12 toward the first body end 16 occurs in two manners, one being when hydraulic fluid under pressure selectively enters through a port 108 located in the body sidewall 14, which communicates with the second compartment 104. The actuator 10 is shown in FIG. 3 with the piston sleeve 84 moved fully toward the first body end 16. By the selective application of fluid pressure to ports 106 and 108, the piston sleeve 84 can be caused to reciprocate within the body 12 and alternately rotate the shaft 20 in one, then the other, rotational direction, such as is needed to open and close a valve. As will now be described, the movement can also occur through the action of a spring 110 positioned in the second compartment 104 (i.e., to the side of the piston sleeve 84 toward the second body end 18).

The spring 110 in the presently preferred embodiment of the invention is a stack of annular Belleville springs coaxially arranged about the actuator shaft 20. One end of the spring 110 is engaged by a spring retainer ring 112 which is positioned in a circumferential groove 114 in the side of the piston sleeve 84 toward the second body end 18. The other end of the spring 110 is engaged by a thrust bearing 116 which is positioned in a circumferential groove 118 in the second end cap 46. The thrust bearing 116 reduces the drag the spring 110 applies to the piston sleeve 84 as the piston sleeve rotates while reciprocating within the body 12 during powered operation of the actuator 10. In the event of a pressure failure in the hydraulic fluid supply to the compartment 102, the spring 110 applies an axial force to the piston sleeve 84 sufficient to rotate the shaft 20 in a direction to close the valve to which it is connected.

As used herein, "fluid" will refer to hydraulic oil, air, or any other fluid suitable for use in the actuator 10. Conventional seals 120 are disposed between the actuator shaft 20 and the retainer 60, between the actuator shaft and the second end cap 46, between the second end cap and the body sidewall 14, between the body sidewall and the body insert 15, and between the body insert and the retainer to prevent fluid leakage from the first and second compartments 102 and 104.

The application of fluid pressure to the first compartment 102 produces axial movement of the piston sleeve 84 toward the second body end 18. The spring 110 positioned within the second compartment 104 is compressed as the fluid pressure axially moves the piston sleeve 84 toward the second body end 18. The actuator 10 is shown with the spring 110 fully compressed in FIG. 2. The stored energy of the compressed spring 110 applies an axial force on the piston sleeve 84 toward the first body end 16; and when the fluid pressure is removed from the first compartment 102, this stored spring energy produces axial movement of the piston sleeve toward the first body end. The result is that the actuator 10 provides relative rotational movement between the body 12 and the actuator shaft 20 through the conversion of linear movement of the piston sleeve 84 into rotational movement of the actuator shaft in a manner that will be described in more detail below. When the external device (not shown) to which the actuator 10 is mounted is a shutoff valve and the actuator shaft 20 is coupled to a valve stem of the valve, the actuator serves to close the valve by the rotation of the shaft 20, which results when the spring 110 has been moved into a compressed state of FIG. 2 and sometime thereafter fluid pressure in the first compartment 102 is lost, such as in an emergency, and the spring moves to a less compressed state of FIG. 3.

In an alternative embodiment, which is not illustrated, the spring 110 can be completely eliminated as a means for axially moving the piston sleeve 84 within the body 12, and only the pressurized hydraulic fluid selectively applied to the ports 106 and 108 used to apply an axial force to the piston sleeve to move it toward the first and second ends 16 and 18.

An inward facing surface portion 122 of the body insert 15, axially inward of the body insert flange portion 68, has cut therein helical grooves 124 having the same lead angle and a uniform lead and axial pitch.

An outward facing surface portion 126 of the shaft 20 has cut therein helical grooves 128 having the same lead angle and a uniform lead and axial pitch. The grooved outward shaft surface portion 126 is located generally opposite the grooved inward body surface portion 122 and spaced apart radially inward therefrom to define a circumferential space 130 therebetween. The helical body grooves 124 have an opposite hand or direction of turn from the helical shaft grooves 128.

A plurality of force-transmitting rollers 132 are disposed in a circumferentially aligned row in the circumferential space 130 between the grooved inward body surface portion 122 and the grooved outward shaft surface portion 126. The rollers 132 rolling along the helical body and shaft grooves 124 and 128 produce a planetary-like action about the actuator shaft 20 as the shaft rotates. The rollers 132 each have an outward facing surface with a pair of circumferential ridges which define circumferential grooves. The circumferential ridges and grooves of each roller 132 extend about the roller in parallel, spaced-apart radial planes. The circumferential ridges of the rollers 132 have substantially the same axial pitch as the helical body and shaft grooves 124 and 128.

The rollers 132 are rotatably retained by a plurality of cylindrical shaft spindles 134 in a fixed axial and circumferential position relative to the piston sleeve 84 as the piston sleeve reciprocates within the body 12 during powered operation of the actuator 10. Each of the spindles 134 has a support arm portion disposed in one of a plurality of bore holes 135 formed in the piston sleeve 84. The bore holes 135 are evenly circumferentially spaced apart about the piston sleeve 84 and axially extend fully through the head portion 86 and the sleeve portion 88 thereof. The support arm portion has a conical head received in a countersink formed in the head portion 86. An O-ring seal is provided in the head to prevent fluid leakage between the first and second compartments 102 and 104. A hexagonal recess is provided in the axial end face of the head to receive a correspondingly shaped tool for rotation of the spindles 134 to eliminate backlash.

Toward the first body end 16, the spindles 134 project into the circumferential space 130 and each rotatably and coaxially holds one of the rollers 132 restrained against axial movement relative to the spindle for rotation about the spindle on an axis in parallel axial alignment with the body 12. The spindles 134 also retain the rollers 132 in circumferentially distributed, spaced-apart positions within the circumferential space 130 about the actuator shaft 20, with each of the rollers in seated engagement and coacting with both the helical body grooves 124 and the helical shaft grooves 128 for transmitting force between the body 12, the actuator shaft 20, and the piston sleeve 84.

The spindles 134 are arranged in parallel axial alignment with the body 12. Each roller 132 is held in place on its spindle 134 by an annular spindle support plate 136. The support plate 136 has a plurality of circumferentially spaced-apart, threaded holes arranged to each threadably receive a threaded free end portion of one of the spindles therein. In the illustrated embodiment of the invention, each of the rollers 132 comprises two annular roller disks 138 independently and rotatably disposed on the spindle end portion in juxtaposition. The two rollers disks 138 operate together to form the roller 132.

Linear movement of the piston sleeve 84 within the body 12 produces rotation of the piston sleeve and the actuator shaft 20 through the force-transmitting capability of the rollers 132. As the piston sleeve 84 linearly moves in one or the other axial direction within the body 12 through application of fluid pressure to the first compartments 102, or the application of fluid pressure to the second compartment 104 and/or the stored energy of the spring 110 applied to the piston sleeve, torque is transmitted by the rollers 132 to the piston sleeve through their coaction with the helical body grooves 124 of the body insert 15. Fluid under pressure applied to the port 106 to apply fluid pressure to the first compartment 102 moves the piston sleeve 84 toward the second body end 18. Fluid under pressure applied to the port 108 to apply fluid pressure to the second compartment 104 and/or the force of the spring 110 moves the piston sleeve 84 toward the first body end 16. The axial force created by fluid pressure on the head portion 86 of the piston sleeve 84, or the axial force applied by the spring 110, causes the rollers 132 to roll along the helical body grooves 124 and transmit torque to the piston sleeve. The body insert 15 is restrained against axial movement relative to the body sidewall 14 during powered operation of the actuator 10 because the threaded portion 15a of the body insert is threadably coupled to the threaded inward end portion 14a of the body sidewall. As will be described below, during powered operation of the actuator 10, the body insert 15 is prevented from rotating relative to the body sidewall 14.

The transmitted torque causes the piston sleeve 84 to rotate as it moves axially. The resulting linear and rotational movement of the piston sleeve 84 transmits both axial and rotational force to the actuator shaft 20 through the coaction of the rollers 132 with the helical shaft grooves 128. The transmitted force causes the actuator shaft 20 to rotate relative to the body 12, since axial movement of the shaft is restricted by the thrust bearings 72. As such, the axial movement of the piston sleeve 84 is converted into rotational movement of the actuator shaft 20 relative to the body 12. The resulting movement of the rollers 132 and actuator shaft 20 relative to the body 12 when viewed from the body ends is much like the movement of a planetary gear arrangement. In similar but reverse fashion, should a sufficient rotational force be applied to the actuator shaft 20, the piston sleeve 84 would be moved axially within the body.

Figure 4:
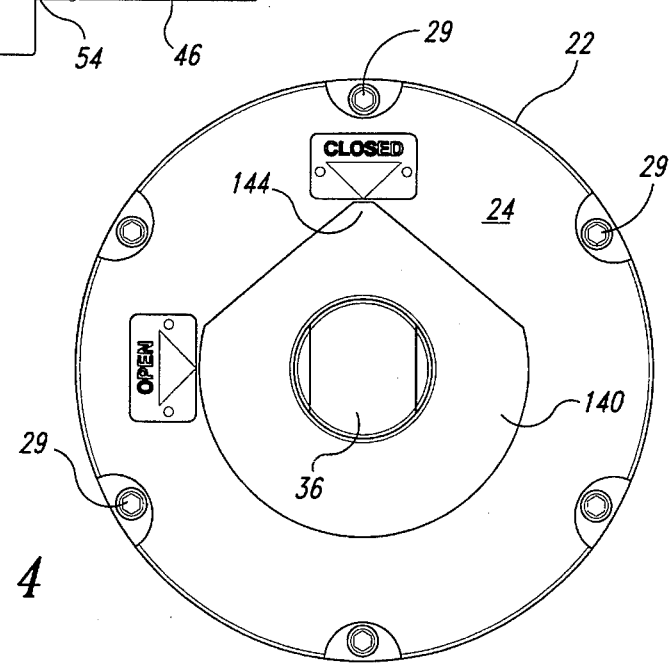
FIG. 4 is a top plan view of the protective end cap of FIG. 1.

As previously described, the first end portion 36 of the stub shaft 34 projects outward beyond the first end cap 22. An annular indicator ring 140 is coaxially positioned on the stub shaft first end portion 36, outward of the endwall portion 124 of the first end cap 22, as shown in FIG. 4. The indicator 140 is retained for rotation with the stub shaft 34, and hence with the actuator shaft 20, by a set screw 142. The indicator ring 140 carries a pointer 144. The outward side of the endwall portion 124 of the first end cap 22 has legends "OPEN" and "CLOSED" printed thereon, rotationally separated by 90 degrees.

The illustrated embodiment of the actuator 10 is designed to produce end-to-end rotation of the actuator shaft 20 of 90 degrees for use to control a valve having a valve stem with close-to-open rotation of 90 degrees. With the second end portion 80 of the adapter shaft 78 engaging the valve stem of a valve in the fully closed position, and the actuator shaft 20 of actuator 10 rotated to its fully clockwise end limit of rotation, when viewed from above the first body end 16 in FIGS. 2 and 3, the body 12 of the actuator is securely mounted to a mounting plate for the valve. When the actuator shaft 20 is in this rotational position, the indicator 140 on the stub shaft 34 is adjustably rotated until the pointer 144 is pointing at the word "CLOSED" printed on the first end cap 22 (as shown in FIG. 4), and then the set screw 142 is tightened. When the actuator 10 is powered to open the valve by rotating the actuator shaft 20 by 90 degrees counterclockwise, and hence rotating the adapter shaft 78 and the valve stem 90 degrees counterclockwise, the valve is fully open and the pointer 144 will point to the word "OPEN" printed on the first end cap 22. This provides a convenient visual indication of the status of the valve to an attendant at the same location as the valve.

However, for when an attendant is not present or it is desirable to provide remote monitoring of the actuator 10, first and second electronic, limit microswitches 146 and 148, respectively, are mounted within the protective compartment 30 formed by the first end cap 22. Each of the microswitches 146 and 148 is secured to a recessed portion 150 on the inward side of the endwall portion 124 of the first end cap 22 by a pair of attachment screws 152. A switch actuator ring 154 is coaxially positioned on the stub shaft 34, within the protective compartment 30, outward of but immediately adjacent to the first end portion 45 of the actuator shaft 20 and inward of the retainer snap ring 43 and the inward side of the endwall portion 124 of the first end cap 22. The switch actuator ring 154 is frictionally engaged by the stub shaft 34 for rotation therewith and with the actuator shaft 20, through an O-ring 156 disposed in a circumferential groove 158 in the stub shaft. As will be described below in more detail, the switch actuator ring 154 rotates with the actuator shaft 20 through its frictional engagement by the stub shaft 34, but the switch actuator ring will rotationally slip on the stub shaft to provide an ability for self-alignment with the first and second microswitches 146 and 148.

The switch actuator ring 154 has a radially outward projecting switch actuator 160 integrally formed as a part thereof. The first microswitch 146 is secured to the endwall portion 124 of the first end cap 22 in a position spaced from and rotationally located relative to stub shaft 34 such that the switch actuator 160 of the switch actuator ring 154 will engage and actuate a contact trigger 162 of the first microswitch when the actuator shaft 20 is rotated to its fully clockwise end limit of rotation (when viewed from above the first body end 16 in FIGS. 2 and 3, which is counterclockwise when viewed from below the first end cap 22 in FIG. 1) which corresponds to the fully closed position of the valve to which the adapter shaft 78 is engaging. Similarly, the second microswitch 148 is secured to the endwall portion 124 of the first end cap 22 in a position spaced from and rotationally located relative to the stub shaft 34 such that the switch actuator 160 of the switch actuator ring 154 will engage and actuate a contract trigger 164 of the second microswitch when the actuator shaft 20 is rotated to its fully counterclockwise end limit of rotation (90 degrees counterclockwise from the fully clockwise end limit of rotation) which corresponds to the fully open position of the valve, such as is shown in FIG. 1. It is noted that while the first and second microswitches 146 and 148 are shown as having contact triggers 162 and 164, they may also be proximity switches which sense the closeness of the switch actuator 160 without requiring contact. Other styles of conventional switches may also be used.

To avoid damage to the first and second microswitches 146 and 148 should the switch actuator 160 engage the contact triggers 162 and 164 with too much force, and also to provide a self-alignment ability, a stop post 166 is securely attached to the inward side of the endwall portion 124 of the first end cap 22, within the protective compartment 30, adjacent to each of the first and second microswitches. Each stop post 166 is received in a bore 167 formed in the endwall portion 124 and projects into the protective compartment 30 in parallel axial alignment with the actuator shaft 20. The stop post 166 of each of the first and second microswitches is positioned to limit rotational movement of the switch actuator toward the contact trigger of the adjacent microswitch to no more than is needed to actuate the contact trigger.

As noted above, the switch actuator ring 154 is only in frictional engagement with the stub shaft 34, with the frictional force applied to the switch actuator ring sufficient to reliably rotate the switch actuator ring with the stub shaft and to actuate the contact triggers 162 and 164 of the first and second microswitches 146 and 148 when engaged therewith, but not so much as to prevent rotational slippage of the switch actuator ring on the stub shaft when engaging one of the stop posts 166. In such fashion, should the first end cap 22 when installed on the body 12, and hence the first and second microswitches 146 and 148 secured thereto, be out of rotational alignment with the actuator shaft 20, the very large rotational drive force generated by the actuator 10 on the actuator shaft will not be transmitted through the switch actuator ring 154 to the microswitches and damage them. Rather, the switch actuator ring 154 will harmlessly slip on the stub shaft 34 when the switch actuator 160 engages one of the stop posts 166. This also rotationally aligns the switch actuator ring 154 on the stub shaft 34 with the end limit of rotation of the actuator shaft 20 which corresponds to the stop post 166 engaged. When the actuator shaft 20 rotates in the reverse direction to its opposite end limit of rotation by 90 degrees, the switch actuator ring 154 will rotate therewith by 90 degrees and actuate the contact trigger for the corresponding microswitch precisely as the actuator shaft reaches its end limit of rotation. It is noted that the stop posts 166 are rotationally separated by 90 degrees, as are the first and second microswitches 146 and 148, to correspond to the 90 degree clockwise end limit to counterclockwise end limit of rotation of the actuator shaft 20.

By positioning the first and second microswitches 146 and 158 within the protective compartment 30 provided by the first end cap 22, the microswitches are protected from contamination from the environment in which the actuator 10 is used and from physical contact which could damage and cause the microswitches to fail. The first end cap 22 is fabricated from rigid metal and has a strong construction to withstand severe physical blows. Conventional seals 168 are disposed between the stub shaft 34 and the first end cap 22 at its central aperture 32, between the body insert 15 and the first end cap at its sidewall portion 26, and between the stub shaft and the hollow central bore 21 of the actuator shaft 20 to seal the compartment 30 against entry of contaminants.

A threaded port 170 is provided through the sidewall portion 26 of the first end cap 22 to threadably receive a threaded electrical connector 171. Electrical wires (not shown) extend within the compartment between the first and second microswitches 146 and 148 and the connector 171 to communicate the electrical signals generated by the microswitches to equipment external of the actuator. The connector 171 also seals the port 170 to prevent contaminants from entering the protective compartment 30.

When the body 12 of the actuator 10 is mounted to a mounting plate or directly to the valve or other external device it is being used to control, it is not always possible upon mounting to align the body 12 with the valve or other external device so that the end limits of rotation of the actuator shaft 20 correspond precisely with the end limits of rotation of the valve stem or other rotatable member of the external device. In the case of a valve, if not precisely aligned, operation of the actuator 10 will either not fully close or not fully open the valve, and perhaps overdrive the valve stem in the opposite rotational direction. As such, the actuator 10 includes an end-limit adjustment mechanism by which the end limits of rotation of the actuator shaft 20 can be aligned with the end limits of rotation of the valve stem without requiring removal or even loosening and rotation of the body 12 from the mounting plate or the adapter shaft 74 from the valve stem. This is accomplished through selective rotational movement of the body insert 15 relative to the body sidewall 14 sufficient to align one end limit of rotation of the actuator shaft 20 with a corresponding end limit of rotation of the valve stem.

It was previously described that as the piston sleeve 84 linearly moves in one or the other axial direction within the body 12 through the application of fluid pressure to the head portion 86 of the piston sleeve or the stored energy of the spring 110, torque is transmitted by the rollers 132 to the piston sleeve through their coaction with the helical body grooves 124 formed on the body insert 15. For this to occur, the body insert 15 must be held stationary relative to the body sidewall 14 during powered operation of the actuator 10. It is noted, however, that the body insert 15 is threadably received with the threaded inward end portion 14a of the body sidewall 14, and intentionally not secured to the body sidewall so that it can freely rotate relative to the body sidewall, to permit end limit rotational adjustment of the actuator shaft 20, as will be described below. If not secured to the body sidewall 14, the body insert 15 would freely rotate within the threaded inward end portion 14a through the torque transmitted thereto by the rollers 132 as the piston sleeve 84 reciprocates within the body 12. If this occurred no torque would be applied by the rollers 132 to the helical shaft grooves 128 and no rotation of the actuator shaft 20 would result from movement of the piston sleeve 84. The actuator 10 of the present invention both secures the body insert 15 to the body sidewall 14 to allow torque transmission during powered operation of the actuator, while allowing the body insert to be selectively rotated relative to the body sidewall for end limit rotational adjustment of the actuator shaft 20.

This is accomplished by use of a pair of adjustment posts 172, each securely attached to the outward side of the body insert 15, within the protective compartment 30, at a diametrically opposite rotational position to the other adjustment post and spaced apart from the axis of the actuator shaft 20. Each adjustment post 172 is received in a bore 174 formed in the body insert 15 and projects into the protective compartment 30, within the recessed portion 150 on the inward side of the endwall portion 124, in parallel axial alignment with the actuator shaft 20. The adjustment posts 172 not only form a part of the end-limit adjustment mechanism, but also serve as a torque transmitting component of the actuator 10. Each of the posts 172 is positioned between a pair of adjustment screws 176 and 178 threadably received in a pair of threaded apertures 180 and 182, respectively, in the sidewall portion 26 of the first end cap 22. The adjustment screws 176 and 178 each have an interior end portion 184 thereof projecting into the protective compartment 30 within the recessed portion 150 on the inward side of the endwall portion 124. One of the pair of adjustment screws is positioned to contact one of the adjustment posts 172, and the other pair of adjustment screws is positioned to contact the other adjustment post. Each of the adjustment screws 176 and 178 has a head portion 186 which terminates within the aperture 180 or 182 in which the adjustment screw is located and which is accessible for grasping with a manual tool (such as a wrench) from the exterior of the first end cap 22 so that the adjustment screw can be turned inward or outward as needed without disassembly of the actuator 10. Each of the threaded apertures 180 and 182 in which the adjustment screws 176 and 178 are located is closed by a plug 187 to keep contaminants out of the aperture.

Each of the adjustment screws 176 is angularly oriented to adjustably rotate the body insert 15 clockwise when the adjustment screw is turned to travel inward with its end portion 184 engaging the post 172 as viewed from above the first body end 16 in FIGS. 2 and 3 (i.e., counterclockwise when viewed from below the first end cap 22 in FIG. 1). Each of the adjustment screws 178 is angularly oriented to adjustably rotate the body insert 15 counterclockwise when the adjustment screw is turned to travel inward with its end portion 184 engaging the post 172 as viewed from above the first body end 16 in FIGS. 2 and 3 (i.e., clockwise when viewed from below the first end cap 22 in FIG. 1). In the illustrated embodiment of the actuator 10, adjustment of the adjustment screws 176 and 178 allows ±7½ degrees (15 degrees total) of rotation adjustment of the body insert 15, and hence of the actuator shaft 20.

Usage of the adjustment screws 176 and 178 will be described when using the actuator 10 to control a valve, but the same general procedure is used when controlling other external devices. The adjustment screws 176 and 178 are adjusted after the body 12 of the actuator 10 is secured to the mounting plate of the valve to be controlled by the actuator and after the adapter shaft 74 is drivably coupled to the valve stem of the valve. With the valve stem in the fully closed position (or the fully open position if selected for aligning the actuator shaft 20), the actuator 10 is operated by the application of fluid pressure or by a manual tool grasping the first end portion 36 of the stub shaft 34 to rotate the actuator shaft 20 into its end limit of rotation corresponding to the selected fully closed (or fully open) valve stem position. Before such rotation of the actuator shaft 20 the adjustment screws 176 and 178 are turned outward to back them away from the adjustment posts 172. After the valve stem and the actuator shaft 20 are both in their corresponding rotational positions, the adjustment screws 176 and 178 are turned inward to bring their end portions 184 into firm contact with the corresponding one of the adjustment post 172. In such fashion, the rotational end limit position of the actuator shaft 20 can be precisely aligned with the corresponding rotational limit position of the valve stem when in the closed (or open) position, and when the actuator 10 is operated under power, the actuator shaft when reaching that same rotational end limit will accurately move the valve stem to the corresponding rotational end limit for the closed (or open) position. In the event that through usage or otherwise it becomes necessary to again adjust the actuator shaft 20 to the valve stem, the process can be repeated easily and quickly using a conventional wrench without disassembly of the actuator 10 except to remove the plugs 187 closing the apertures 180 and 182 in which the adjustment screws 176 and 178 are located, and without removal or even loosening of the actuator body 12 from its mounting or the adapter shaft 74 from the valve stem.

It is noted that when the adjustment screws 176 and 178 are in firm contact with the adjustment posts 172, the body insert 15 and the body sidewall 14 are effectively locked together, through the first end cap 22, such that during powered operation of the actuator 10, torque applied by the rollers 132 carded by the piston sleeve 84 through the rollers engaging the helical body grooves 124 formed on the body insert 15, will be transmitted through the adjustment posts 172 secured to the body insert to the adjustment screws 176 and 178 in firm contact therewith and threadably received in the apertures 180 and 182 of the first end cap 22. The torque is then transmitted through the bolts 29 which secure the first end cap 22 to the body sidewall 14. In such fashion, the body insert 15 and the body sidewall 14 are locked together against rotation relative to each other during powered operation of the actuator 10, with the first end cap 22 serving as a torque transmitting element and locking the two together. While the necessary torque transmission occurs between the body insert 15 and the body sidewall 14 because they are locked together during powered operation, the body insert 15 can be selectively rotated relative to the body sidewall 14 when needed to adjust the actuator shaft end limit of rotation relative to a valve or other external device to be controlled.

As with the first and second microswitches 146 and 158, the protective compartment 30 provided by the first end cap 22 protects the adjustment screws 176 and 178 and the adjustment posts 172 from contamination from the environment in which the actuator 10 is used and from physical contact which could damage and cause the end limit adjustment mechanism to fail. Furthermore, the single compartment 30 is provided for housing both the electrical components and the end limit adjustment components.

It will be appreciated that, although a specific embodiment of the invention has been described herein for purposes of illustration, various modifications may be made without departing from the spirit and scope of the invention. Accordingly, the invention is not limited except as by the appended claims.

I claim:

1. A rotary actuator for providing rotary movement between first and second external members, comprising:

a body having a longitudinal axis, and first and second ends, said body being adapted for coupling to the first external member;

a shaft extending generally coaxially within said body and supported for rotation relative thereto, said shaft having an adjustable end limit of rotation relative to said body, said shaft having a grooved, outwardly facing circumferential sidewall portion positioned within said body and a portion adapted for coupling to the second external member to provide rotational movement between the first and second external members;

a body insert positioned generally coaxial with said body and at least partially within said body at said body first end and extending about said shaft with an annular space therebetween, said body insert having a grooved, inwardly facing circumferential sidewall portion, said body insert being formed as a separate part from said body and being adjustably rotatable relative to said body to permit adjustment of said end limit of rotation of said shaft relative to said body, said body insert being restrained by said body against axial movement relative to said body during powered operation of the actuator, said body insert having a contact portion;

an end cap securely attached to said body at said body first end and spaced axially outward of and away from said body insert to define a compartment therebetween, said end cap having an aperture therethrough extending between an exterior portion thereof and said compartment;

an adjustment member extending through said aperture with an interior portion within said end cap compartment in position to engage said contact portion of said body insert and an exterior portion accessible from the exterior of said end cap compartment, said adjustable member being adjustably movable in said aperture to apply an adjustment force on said contact portion of said body insert to adjustably rotate said body insert relative to said body to a selected rotational position relative to said body in order to adjust said end limit of rotation of said shaft relative to said body, said adjustment member, when not being adjustably moved in said aperture, holding said contact portion of said body insert to prevent rotation of said body insert from said selected rotational position relative to said body; and a torque-transmitting annular member positioned generally coaxially within said body in said annular space between said body insert and said shaft and extending about said shaft, said torque-transmitting member being mounted within said body and reciprocally axially movable therein, said torque-transmitting member engaging both said shaft grooved sidewall portion and said body insert grooved sidewall portion as said torque-transmitting member reciprocally moves within said body to translate axial movement of said torque-transmitting member toward said body first end into one of clockwise or counterclockwise relative rotational movement between said shaft and said body and axial movement of said torque-transmitting member toward said body second end into the other of clockwise or counterclockwise relative rotational movement between said shaft and said body, said selected rotational position of said body insert relative to said body determining said end limit of rotation of said shaft relative to said body produced by said torque-transmitting member.

2. The rotary actuator of claim 1, wherein said contact portion of said body insert projects toward said end cap and into said end cap compartment.

3. The rotary actuator of claim 2, wherein said body insert is a circular member and said contact portion is securely attached to said circular member.

4. The rotary actuator of claim 3 wherein said projecting contact portion is a post received in a recess in said circular member.

5. The rotary actuator of claim 2, wherein said adjustment member is an adjustment screw and said end cap aperture is threaded to threadably receive said adjustment screw.

6. The rotary actuator of claim 2 wherein said adjustment member includes first and second adjustment screws and said end cap aperture includes first and second apertures, each threaded and threadably receiving a corresponding one of said first or second adjustment screws, said first and second adjustment screws being oriented such that said first adjustment screw engages said contact portion of said body insert to rotate said body insert clockwise relative to said body when rotated to move inward in said first aperture and said second adjustment screw engages said contact portion of said body insert to rotate said body insert counterclockwise relative to said body when rotated to move inward in said second aperture.

7. The rotary actuator of claim 1 wherein said body insert has a threaded portion and said body has a correspondingly threaded portion to threadably couple said body insert and said body together to permit adjustment of said end limit of rotation of said shaft relative to said body while restraining said body insert against axial movement relative to said body during operation of the actuator.

8. The rotary actuator of claim 1 wherein said body insert has a threaded perimeter portion and said body has a correspondingly threaded interior portion to threadably receive said threaded body insert perimeter portion therewithin and couple said body insert and said body together.

9. The rotary actuator of claim 1 wherein said end cap has a circumferential sidewall portion with said end cap aperture therein, and said sidewall portion engages said body at said body first end.

10. The rotary actuator of claim 9, wherein said end cap has an endwall spanning said sidewall portion, and said sidewall portion sealably contacts said body insert.

11. The rotary actuator of claim 1, wherein said body includes a body sidewall and an endwall, said body insert closing said body sidewall at said body first end, and said endwall closing said body sidewall at said body second end to define a first fluid compartment within said body between said body insert and said torque-transmitting member toward said body first end and a second fluid compartment within said body between said body endwall and said torque-transmitting member toward said body second end, at least one of said first or second fluid compartments having pressurized fluid selectively applied thereto to move said torque-transmitting member toward one of said body first or second ends, said end cap compartment being a dry compartment separate from said first fluid compartment.

12. The rotary actuator of claim 1, further including an electrical end limit switch and a switch actuator positioned in said end cap compartment, and wherein said end cap has an endwall with said end limit switch mounted thereto, and said shaft has an end portion extending into said end cap compartment with said switch actuator mounted thereon in position to engage and actuate said end limit switch as said shaft rotates in a first rotational direction sufficient to reach said end limit of rotation, whereby said end limit switch sends an electrical signal indicative of said shaft rotating in said first rotational direction to said end limit of rotation when actuated by said switch actuator.

13. The rotary actuator of claim 12, wherein the actuator further includes a stop mounted to said endwall and positioned adjacent to said end limit switch to limit continued rotation of said switch actuator in said first rotational direction after said switch actuator actuates said end limit switch, and wherein said switch actuator is friction slip fit on said shaft end portion with sufficient frictional engagement to rotate with said shaft end portion and supply a sufficiently large force on said switch actuator to actuate said end limit switch when rotated by said shaft end portion in said first rotational direction into engagement therewith, said frictional engagement being sufficiently low that said stop holds said switch actuator against further rotation in said first rotational direction while said shaft end portion continues to rotate in said first direction until said shaft reaches said end limit of rotation, whereby said stop will align said switch actuator with said end limit switch when said shaft reaches said end limit of rotation.

14. The rotary actuator of claim 12, wherein said body insert has a central aperture and said shaft end portion extends therethrough into said end cap compartment.

15. The rotary actuator of claim 14, further including an indicator, and wherein said endwall has a central aperture and said shaft end portion extends therethrough to exterior of said end cap compartment, said indicator being mounted on said shaft end portion at a position axially outward of said endwall and secured to said shaft end portion to rotate therewith, whereby said indicator provides a visual indication of the rotational position of said shaft.

16. A rotary actuator for providing rotary movement between first and second external members, comprising:
   a body having first and second ends, said body being adapted for coupling to the first external member;
   a drive member extending within said body and supported for rotation relative thereto, said drive member having an adjustable end limit of rotation relative to said body, said drive member having a portion adapted for coupling to the second external member to provide rotational movement between the first and second external members;
   a rotatable member positioned at least partially within said body at said body first end, said rotatable member being formed as a separate part from said body and being adjustably rotatable relative to said body to permit adjustment of said end limit of rotation of said drive member relative to said body, said rotatable member being restrained by said body against axial movement relative to said body during operation of the actuator, said rotatable member having a contact portion;
   a body closure securely attached to said body at said body first end to define a compartment between said body closure and said rotatable member, said body closure having an aperture therein extending between an exterior of the actuator and said compartment;
   an adjustment member extending through said aperture with an interior portion within said compartment in position to engage said contact portion of said rotatable member and an exterior portion accessible from the exterior of said compartment, said adjustable member being adjustably movable in said aperture to apply an adjustment force on said contact portion of said rotatable member to adjustably rotate said rotatable member relative to said body to a selected rotational position relative to said body in order to adjust said end limit of rotation of said drive member relative to said body, said adjustable member, when not being adjustably moved in said aperture, holding said contact portion to prevent rotation of said rotatable member from said selected rotational position relative to said body; and
   a torque-transmitting member mounted for reciprocal movement within said body between a position toward said body first end and a position toward said body second end, said torque-transmitting member engaging said rotatable member and said drive member as said torque-transmitting member reciprocally moves within said body to translate movement thereof toward said body first end position into one of clockwise or counterclockwise relative rotational movement between said drive member and said body and movement thereof toward said body second end position into the other of clockwise or counterclockwise relative rotational movement between said drive member and said body, said selected rotational position of said rotatable member relative to said body determining said end limit of rotation of said drive member relative to said body produced by said torque-transmitting member.

17. A rotary actuator for providing rotary movement between first and second external members, comprising:
   a generally cylindrical first body portion having a longitudinal axis, and body first and second ends, said first body portion being adapted for coupling to the first external member;
   a shaft extending generally coaxially within said first body portion and supported for rotation relative thereto, said shaft having an adjustable end limit of rotation relative to said first body portion, said shaft having a grooved, outwardly facing circumferential sidewall portion positioned within said first body portion and a portion adapted for coupling to the second external member to provide rotational movement between the first and second external members;
   a second body portion positioned generally coaxial with said first body portion and at least partially within said first body portion at said body first end and extending about said shaft with an annular space therebetween, said second body portion having a grooved, inwardly facing circumferential sidewall portion, said second body portion being formed as a separate part from said first body portion and being adjustably rotatable relative to said first body portion to permit adjustment of said end limit of rotation of said shaft relative to said first body portion;
   a third body portion securely attached to said first body portion at said body first end, said third body portion defining a compartment between said second body portion and said third body portion;
   a fourth body portion restraining said second body portion against axial movement relative to said first body portion during powered operation of the actuator;
   an adjustment member extending through an aperture into said compartment in position to engage said second body portion, said adjustment member having a portion accessible from exterior of said compartment, said adjustable member being adjustably movable in said aperture to apply an adjustment force between said third body portion and second body portion to adjustably rotate said second body portion relative to said first body portion to a selected rotational position relative to said first body portion in order to adjust said end limit of rotation of said shaft relative to said first body portion, said adjustment member, when not being adjustably moved, holding said second body portion to prevent rotation of said second body portion from said selected rotational position relative to said first body portion; and
   a torque-transmitting annular member positioned generally coaxially within said first body portion in said annular space between said first body portion and said shaft and extending about said shaft, said torque-transmitting member being mounted within said first body portion and reciprocally axially movable therein, said torque-transmitting member engaging both said shaft grooved sidewall portion and said second body portion grooved sidewall portion as said torque-transmitting member reciprocally moves within said first body portion to translate axial movement of said torque-transmitting member toward said body first end into one of clockwise or counterclockwise relative rotational movement between said shaft and said first body portion and axial movement of said torque-transmitting member toward said body second end into the other of clockwise or counterclockwise relative rotational movement between said shaft and said first body portion, said selected rotational position of said second body portion relative to said first body portion determining said end limit of rotation of said shaft relative to said first body portion produced by said torque-transmitting member.

* * * * *